United States Patent
Li et al.

(10) Patent No.: US 7,169,224 B2
(45) Date of Patent: *Jan. 30, 2007

(54) PROCESS FOR INCREASING THE DUCTILITY OF HIGH PERFORMANCE FIBER-REINFORCED BRITTLE MATRIX COMPOSITES, AND COMPOSITES PRODUCED THEREBY

(75) Inventors: Victor C. Li, Ann Arbor, MI (US); Shuxin Wang, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 25 days.

This patent is subject to a terminal disclaimer.

(21) Appl. No.: 10/836,898

(22) Filed: Apr. 30, 2004

(65) Prior Publication Data

US 2005/0241534 A1    Nov. 3, 2005

(51) Int. Cl.
*C04B 14/38* (2006.01)
(52) U.S. Cl. .................. 106/644; 106/716; 106/718; 106/724
(58) Field of Classification Search ............... 106/644, 106/713, 724
See application file for complete search history.

(56) References Cited

U.S. PATENT DOCUMENTS

| | | | | |
|---|---|---|---|---|
| 3,233,011 A | * | 2/1966 | Kurz et al. | |
| 4,902,347 A | * | 2/1990 | Sourushian et al. | |
| 5,112,405 A | * | 5/1992 | Sanchez | 106/608 |
| 5,641,815 A | * | 6/1997 | Fehlmann | 521/154 |
| 5,788,760 A | * | 8/1998 | Li et al. | 106/644 |
| 5,861,057 A | * | 1/1999 | Berg et al. | 106/672 |
| 5,993,537 A | | 11/1999 | Trottier et al. | |
| 6,478,867 B1 | * | 11/2002 | Cheyrezy et al. | 106/644 |
| 6,723,162 B1 | * | 4/2004 | Cheyrezy et al. | 106/644 |
| 2005/0066857 A1 | * | 3/2005 | Li et al. | 106/672 |
| 2005/0066858 A1 | * | 3/2005 | Li et al. | 106/692 |

FOREIGN PATENT DOCUMENTS

| | | | |
|---|---|---|---|
| JP | 2002193653 | * | 7/2002 |
| RU | 2165399 | * | 4/2001 |
| WO | WO 99/58468 | | 11/1999 |

OTHER PUBLICATIONS

V.C. Li et al., "Interface Tailoring for Strain-Hardening PVA-ECC," ACI Materials Journal 99(5):463-472; Oct. 2002.
T. Kanda et al., "Multiple Cracking Sequence and Saturation in Fiber-Reinforced Cementitious Composites," JCI Concrete Research And Technology 9(2):19-33 (1998).

(Continued)

*Primary Examiner*—Paul Marcantoni
(74) *Attorney, Agent, or Firm*—Brooks Kushman P.C.

(57) ABSTRACT

Purposeful addition of crack-initiating voids in the form of low tensile strength particulates, particulates having low matrix interaction, or gas bubbles formed by chemical reaction, in a size range of 0.5 mm to about 5 mm, and preferably of a size commensurate with or larger than naturally occurring crack-initiating gaseous voids, to fiber-reinforced strain hardening cementitious composites generates controlled and uniform cracking which increases strain hardening behavior in conventionally dense cementitious compositions.

35 Claims, 5 Drawing Sheets

OTHER PUBLICATIONS

V.C. Li, "Post-Crack Scaling Relations for Fiber-Reinforced Cementitious Composites," ASCE J. of Materials In Civil Engineering 4(1): 41-57 (1992).

V.C. Li, "Engineered Cementitious Composites—Tailored Composites Through Micromechanical Modeling," In N. Banthia, A. Bentur, A. & A. Multi (eds.) Fiber Reinforced Concrete: Present and the Future: 64-97, Montreal:Canadian Society for Civil Engineering (1998).

V.C. Li et al., "Steady State and Multiple Cracking of Short Random Fiber Composites," ASCE J. Of Engineering Mechanics, vol. 188, No. 11, pp. 2246-2264.

V.C. Li et al., "Matrix Design for Pseudo Strain-Hardening Fiber Reinforced Cementitious Composites," RILEM J. Materials And Structures, 28(183):586-595 (1995).

Z. Lin et al., "On Interface Property Characterizations and Performance of Fiber Reinforced Cementitious Composites," J. Concrete Science And Engineering, RILEM 1:173 (1999).

H.C. Wu et al., "Stochastic Process of Multiple Cracking in Discontinuous Random Fiber Reinforced Brittle Matrix Composites," Int'l. J. Of Damage Mechanics 4(1):83-102 (1995).

A. Katz et al., "A Special Technique for Determining the Bond Strength of Carbon Fibers in Cement Matrix by Pullout test," Journal Of Materials Science Letters, 15 pp. 1821-1823 (1996).

D. Marshall and B.N. Cox, "A J-integral Method for Calculating Steady-State Matrix Cracking Stress in Composites," Mechanics Of Materials, V. 7, No. 8, Aug. 1988, pp. 127-133.

* cited by examiner

PROCESS FOR INCREASING THE DUCTILITY OF HIGH PERFORMANCE FIBER-REINFORCED BRITTLE MATRIX COMPOSITES, AND COMPOSITES PRODUCED THEREBY

BACKGROUND OF THE INVENTION

1. Field of the Invention

The present invention is directed to high performance fiber-reinforced brittle matrix composites such as those having a cementitious matrix and containing matrix interactive reinforcing fibers.

2. Background Art

Fiber-reinforced cementitious composites have been made for many years. However, only relatively recently have the micromechanics of fiber-reinforced brittle matrix composites been understood so as to significantly improve the physical properties of such composites. For example, in published PCT application No. WO 99/58468, moderate strain hardening is achieved in concrete of normal density by incorporation of both 4% by volume of polyvinyl alcohol fibers and a densified matrix. Despite the relatively high volume percentage of fibers, the strain capacity is still only 0.5%. Moreover, concrete containing a relatively high volume percentage of fibers such as that of WO 99/58468 is difficult to mix, particularly on site.

In U.S. Pat. No. 5,993,537, special polypropylene copolymer fibers which fibrillate during admixture to concrete mixes are said to provide enhanced impact resistance and flexural strength. However, no improvement in uniaxial tensile strength nor tensile ductility is disclosed. In several studies by Li and coworkers, i.e., V. C. Li et al., "Interface Tailoring for Strain-Hardening PVA-ECC," ACI MATERIALS JOURNAL 99(5):463–472; T. Kanda et al., "Multiple Cracking Sequence and Saturation in Fiber-Reinforced Cementitious Composites," JCI CONCRETE RESEARCH AND TECHNOLOGY 9(2): 19–33 (1998); V. C. Li, "Post-Crack Scaling Relations for Fiber-Reinforced Cementitious Composites," ASCE J. OF MATERIALS IN CIVIL ENGINEERING 4(1): 41–57 (1992); V. C. Li, "Engineered Cementitious Composites—Tailored Composites Through Micromechanical Modeling," In N. Banthia, A. Bentur, A. & A. Multi (eds.) Fiber Reinforced Concrete: Present and the Future: 64–97, Montreal:Canadian Society for Civil Engineering (1998); V. C. Li et al., "Steady State and Multiple Cracking of Short Random Fiber Composites," ASCE J. OF ENGINEERING MECHANICS, Vol. 188, No. 11, pp. 2246–2264; V. C. Li et al., "Matrix Design for Pseudo Strain-Hardening Fiber Reinforced Cementitious Composites," RILEM J. MATERIALS AND STRUCTURES, 28(183):586–595 (1995); Z. Lin et al., "On Interface Property Characterizations and Performance of Fiber Reinforced Cementitious Composites," J. CONCRETE SCIENCE AND ENGINEERING, RILEM 1:173 (1999); and H. C. Wu et al., "Stochastic Process of Multiple Cracking in Discontinuous Random Fiber Reinforced Brittle Matrix Composites," INT'L. J. OF DAMAGE MECHANICS 4(1):83–102 (1995), and also in studies by others, a much greater understanding of the role of fiber reinforcement in cementitious matrices has been developed. For example, it has been found in general, that fibers which exhibit little interaction with the fiber matrix produce little or no increase in ductility, as measured by uniaxial tensile strain capacity. On the other hand, fibers such as untreated polyvinyl alcohol fibers, which exhibit exceptionally strong matrix interactions, also fail to generate ductile behavior. In the case of polypropylene fibers, for example, as a crack in the composite develops, the polypropylene fibers are easily pulled from the matrix, and multiple cracking cannot occur. As a result, the fibers do little to increase strain once a crack has developed. Fibers such as untreated polyvinyl alcohol, on the other hand, resist pullout to the extent that little elongation takes place until the tensile strength of the fiber is reached, resulting in catastrophic failure.

It has also been found, somewhat counter-intuitively, that fiber-reinforced composites with high matrix fracture toughness exhibit lesser ductility than those with lower matrix fracture toughness. Studies support the theory that lower fracture toughness matrices generate an increased number of cracks. The increased number of fractures allows the tensile strain to be distributed across a wider number of cracks. With the proper volume percentage of fibers, generally about 2.5 volume percent or less, an appropriate fiber-to-matrix interaction, and a suitable matrix, tensile strain of from 3 to 5% may be achieved. Such amounts of strain are not ordinarily associated with cementitious products, which are commonly thought of as brittle and unyielding. Moreover, these latter products, which are termed "high performance fiber-reinforced cementitious composites" (HPFRCC) by the art, actually exhibit increasing strength with increasing strain, a type of ductility commonly associated with metals, but not with cementitious construction compositions.

Unfortunately, increasing the number of cracks in fiber-reinforced cementitious composites has required the use of cementitious matrices of lesser strength. When higher strength, particularly higher fracture toughness matrices are employed, cracking tends to be localized and/or unpredictable, in many cases but few cracks developing under stress, and strain hardening is difficult or impossible to achieve.

Even more important in the use of strain hardening cementitious composites is the change in cracking behavior which occurs due to processing variables. Difficulties associated with achieving thorough mixing are increased when reinforcing fibers are employed, and mixing on site exacerbates these problems. Entrainment of air, for example, is more likely when fibers are included in the matrix, and air pockets provide natural flaws where cracks may initiate and propagate. Such natural flaws also develop where incomplete wetting of aggregate occurs. Unfortunately, such flaws are not uniformly distributed, and often tend to concentrate within limited portions of the composite structure, while other portions are substantially free of such natural crack initiation sites. As a result, strain hardening behavior is much reduced or even absent as compared with test specimens of identical composition prepared under more ideal conditions. An example of this type of behavior is illustrated in FIG. 6.

It would be desirable to provide high strength, fiber-reinforced brittle matrix composites which exhibit saturated multiple cracking under tensile stress, this multiple cracking occurring uniformly over the entire composite. It would be further desirable to employ cementitious compositions of higher matrix strength which are also able to exhibit the multiple cracking suitable for strain hardening behavior, and which provide these desirable properties even when mixing is performed on site.

SUMMARY OF THE INVENTION

It has now been surprisingly discovered that the strain hardening behavior and other flaw-associated strength properties of fiber-reinforced brittle matrix composites can be materially increased by purposefully incorporating crack-initiating sites in the composite. The crack-initiating sites comprise active or passive voids in the matrix which are uniformly distributed therein.

DETAILED DESCRIPTION OF THE PREFERRED EMBODIMENTS

Figure 1:
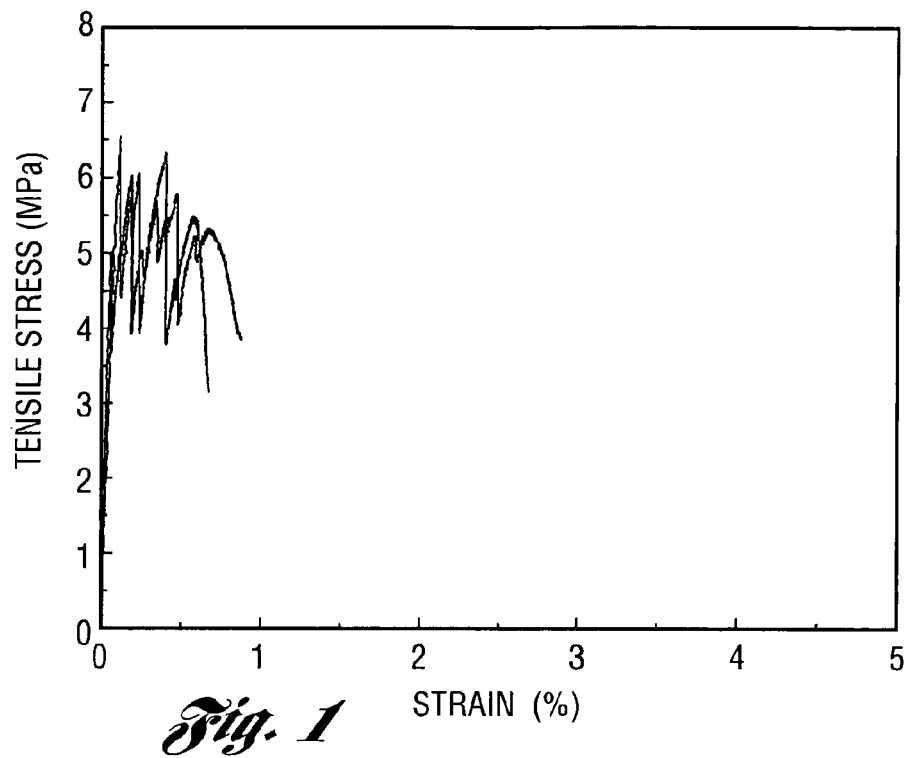
FIG. 1 illustrates a typical cracking pattern of a fiber-reinforced composite of the prior art having limited ductility.
Figure 2:
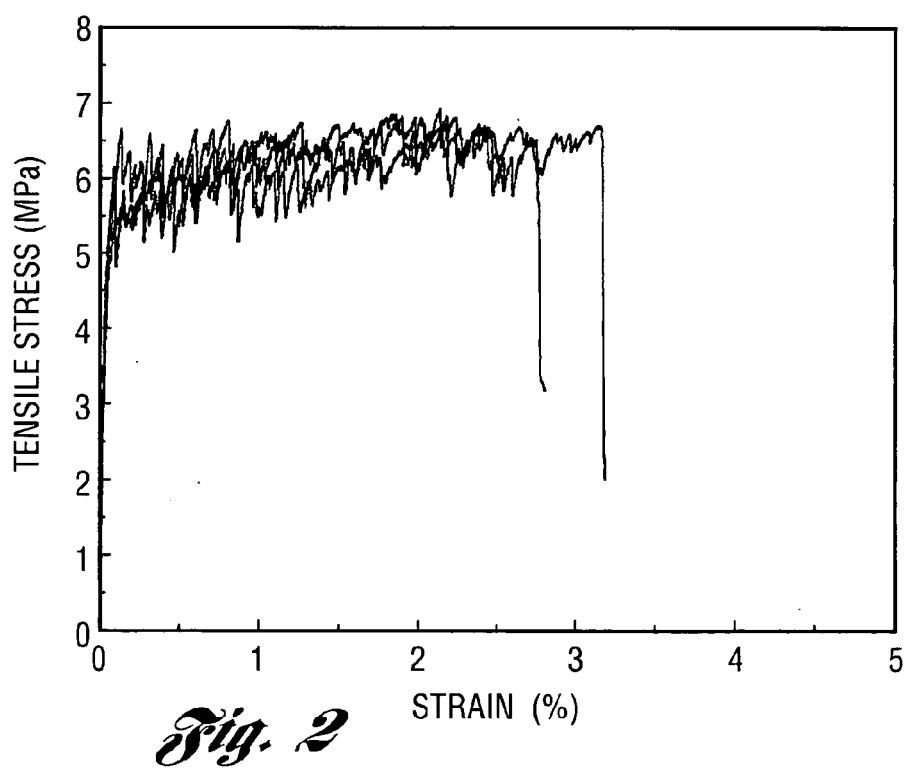
FIG. 2 illustrates the cracking pattern of the same composite as in FIG. 1, but with purposefully added crack-initiating voids. The cracks are numerous and uniformly spaced.
Figure 3:
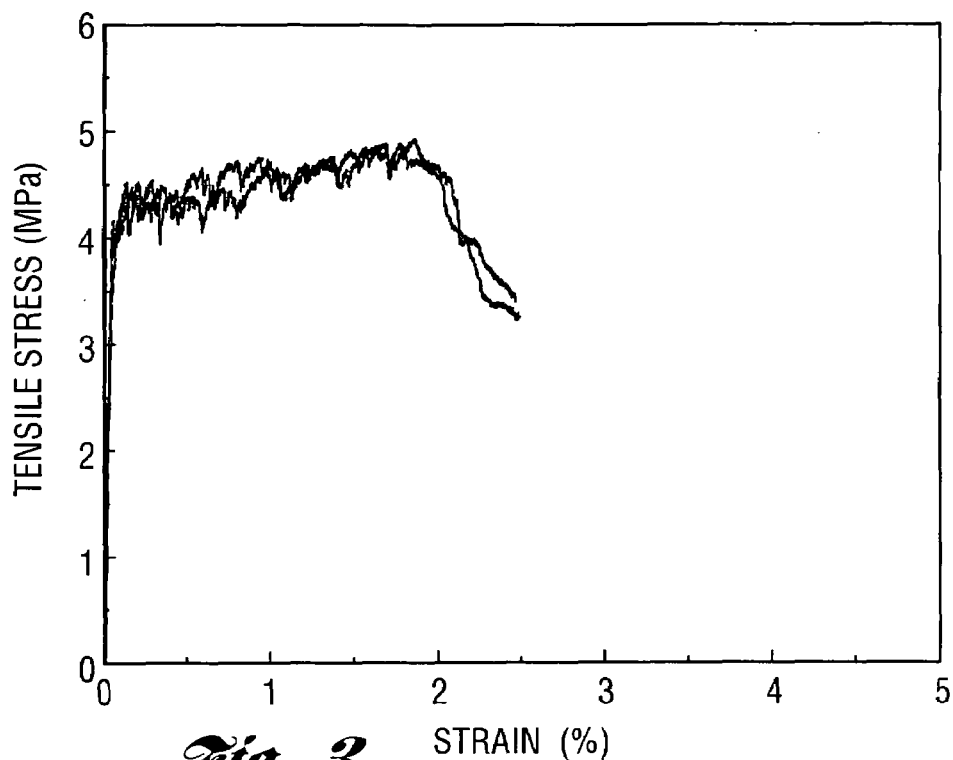
FIG. 3 illustrates the stress v. strain curve of Comparative Example C1.
Figure 4:
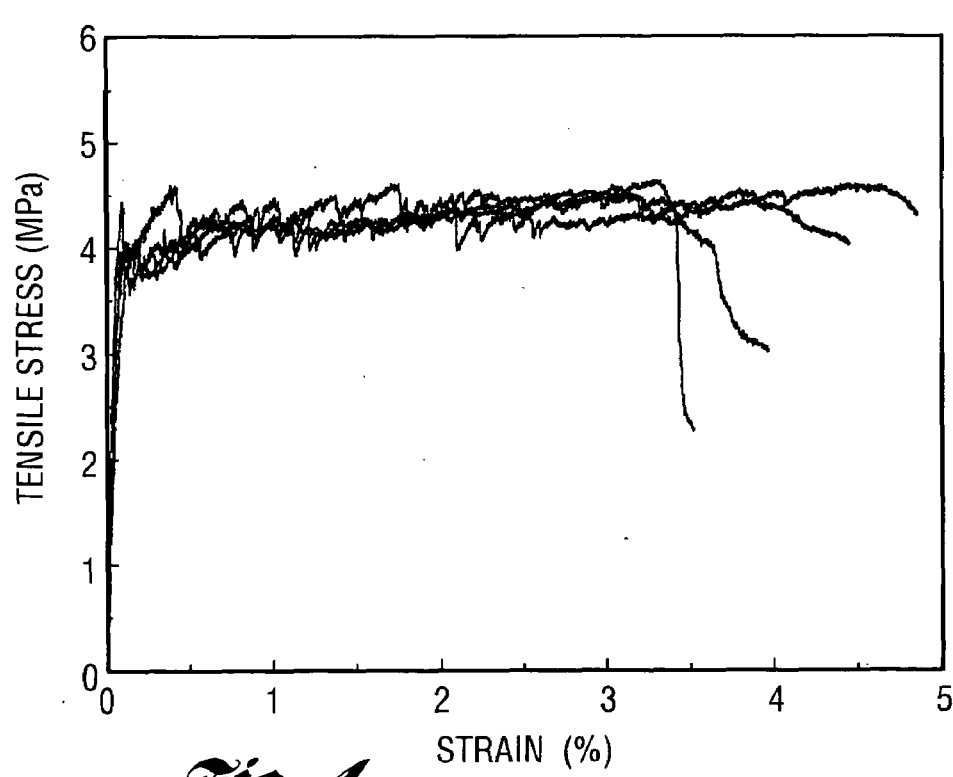
FIG. 4 illustrates the stress v. strain curve of Example 1.
Figure 5:
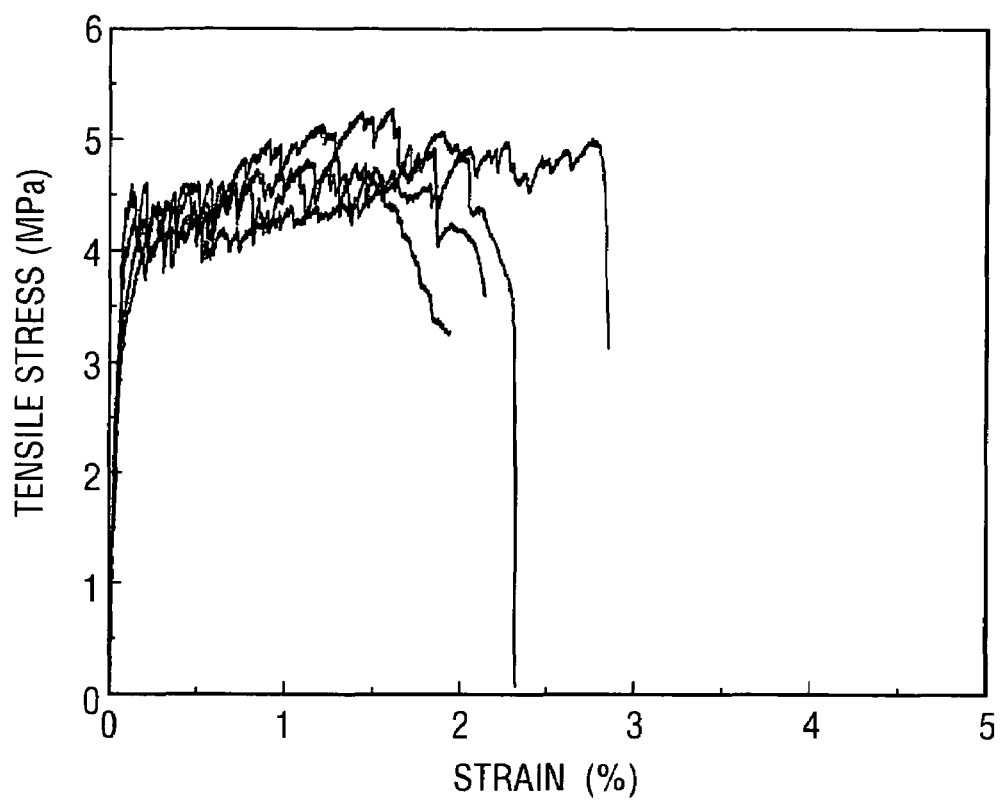
FIG. 5 illustrates the stress v. strain curve of Comparative Example C2.

The composites of the present invention comprise a brittle matrix and a relatively low volume fraction of fiber-reinforcement, preferably below 5 volume percent and most preferably about 2.5 volume percent or less. The brittle matrix may, in principle, be a highly crosslinked organic matrix such as an epoxy resin or the like, but is preferably a ceramic, geopolymer, or most preferably, a hydraulically setting cementitious composition. Cementitious and geopolymer matrices may also include conventional additives such as coloring agents, thixotropes, viscosity modifiers, superplasticizers, etc. The compositions must also include intentionally added crack-initiating voids as described hereafter.

The brittle matrix is one of ordinary density such that a relatively high matrix strength may be obtained. For cementitious composites, the matrix, without addition of intentionally added voids, will in general have a density in excess of 1.95 $g/cm^3$, preferably between about 2.0 $g/cm^3$ and 2.4 $g/cm^3$, and most preferably between about 2.1 $g/cm^3$ and 2.3 $g/cm^3$. Thus, the invention is not directed to lightweight concrete products, which have a density of about 1.9 $g/cm^3$ or less, generally in the range of about 1.0 $g/cm^3$ to 1.6 $g/cm^3$.

The hydraulically setting cementitious composites may include Portland cement, blended Portland cement, rapid setting and hardening cement, expanding cement, pozzolanic cement, mixtures thereof, etc. The mix may also include calcium aluminate cement, and a variety of hydraulically settable metal aluminates such as sodium calcium aluminate, calcium magnesium aluminate, calcium potassium aluminate, etc. Silicates such as water glass may also be employed, as may also lime, plaster of paris, etc.

The hydraulically setting cement generally includes aggregate. Aggregate may be in the nature of sand, for example quartz sand, ground limestone, ground dolomite, and other mineral-derived aggregates of similar relatively small particle size, as well as larger aggregate in the form of igneous and sedimentary gravels, including gravels naturally derived, i.e., "pea gravel" as well as gravel derived from crushing rock.

The mix may also contain lightweight aggregate in particle sizes below about 1 mm, and preferably in the range of 10 μm to 400 μm, more preferably 50 to 300 μm, so long as the density of the mix is above about 1.95 $g/cm^3$. Lightweight aggregate includes numerous expanded natural materials as well as synthetic microballoons, for example those of glass or ceramic. Preferred microspheres or "microballoons" are hollow ceramic or glass microspheres such as those available from the 3M Company under the tradename "Scotchlite™" Glass Bubbles, i.e. Scotchlite S38 with a density of 380 $Kg/m^3$, a size distribution between 10 and 80 μm, and a mean particle size of 40 μm; and Scotchlite S60, with a density of 600 $Kg/m^3$, a size distribution of 10 to 60 μm, and a mean particle size of 30 μm. Preferred ceramic microspheres include Extendospheres™, available from PQ Corporation, and Zeospheres™, available from 3M Corporation.

Polymer microballoons are also useful. Examples of polymer microballoons include micro-hollow-bubble MHK, having a density of 16.7 $Kg/m^3$, a size distribution of 40–120 μm, an average mean size of 80 μm, available from Heidelberger Bauchemie Co., Ltd., Leimen, Germany, and composed of polyvinylidene chloride/acrylonitrile copolymer. In selecting polymer microballoons, it is desirable to select those which interact with the brittle matrix through a content of polar groups, hydrophilic groups, or reactive groups, although non-interactive microballoons are useful as well. Microballoons of many types of polymers are commercially available. Lightweight aggregates generally exhibit a strong matrix interaction, and are preferably used only in minor proportions, or are absent entirely.

Gas bubbles derived from mechanical incorporation of gas during the mixing process may also be included, again provided that the density of the mixture without the purposefully introduced voids be greater than 1.95 $g/cm^3$. If gas is purposefully introduced, it is desirable that it be introduced in the form of bubbles of rather uniform size, and that the gas bubbles be stabilized against coalescence such that their size distribution may be substantially maintained during cure of the composite. A narrow gas bubble size distribution is preferable. Most preferably, gas bubbles present are only those which cannot be, avoided during the mixing process selected, rather than gas purposefully incorporated. Vacuum mixing techniques can be employed to minimize the occurrence and the size of gas bubbles introduced during the mixing process.

Conventional ingredients useful in cement mixtures include viscosity control agents. Numerous viscosity control agents are commercially available, including modified celluloses such as hydroxypropylmethylcellulose available as "Methocel™ cellulose ethers from Dow. Chemical Co., and polymeric thickeners such as polyvinyl alcohol polymers. The amount of viscosity control agent may be any amount which is effective, generally from 0.5 pph to 5 pph, preferably about 1 pph based on the weight of the cement component. Water reducing agents, or "superplasticizers" may also be useful. One such reducing agent, or "superplasticizer," is a melamine formaldehyde condensate available from W.R. Grace & Co., Illinois, as Melment™ 300. The amount of water reducing agent will vary with the particular components of the mix as well as the amount of water used, but is generally in the range of 0.5 pph to 5 pph, preferably 1 pph to 5 pph based on the amount of cement.

Pigments and colorants may also be included, including a variety of inorganic pigments such as iron oxides. Other natural and synthetic pigments may also be used. Polymeric additives including hydrophobicizing additives, slump control additives, self-leveling additives, strength altering additives, etc., may also be employed. Many such polymeric additives are commercially available, in the form of aqueous dispersions, or in the form of redispersible polymer powders. Examples include polymers based on vinyl esters, particularly vinyl acetate and vinyl propionate; copolymers of vinyl esters and ethylene, preferably vinyl acetate and ethylene; acrylate ester and methacrylate ester polymers and copolymers; styrene polymers; styrene copolymers, particularly with diolefins such as butadiene; vinyl chloride polymers, and the like. Such redispersible polymer powders for use in hydraulically setting building materials are available from BASF A.G., Wacker-Chemie GmbH, and Hoechst A.G., among others.

A principle and necessary ingredient of the composite compositions of the subject invention is a matrix interactive fiber. Preferred fibers are those having a degree of interaction between the fiber and the matrix substantially greater than polypropylene. The interaction of the fiber with the matrix can be determined by the single-fiber pullout test as described in A. Katz et al., "A Special Technique for Determining the Bond Strength of Carbon Fibers in Cement Matrix by Pullout Test," JOURNAL OF MATERIALS SCIENCE LETTERS, 15 pp. 1821–23 (1996). The interaction includes both interfacial chemical bonding as well as interfacial frictional stress. Preferred fibers can be selected from a consideration of cementitious matrix properties, as disclosed in the previously cited references. The fibers must have a substantial degree of matrix interaction such that they resist pullout from the matrix. In general, fibers which are relatively polar are suitable. Such fibers include polyester fibers, for example those of polyethylene terephthalate, polyethylene naphthalate, polyesters based on cyclohexanedimethanol as the diol component, polycaprolactones, and the like. Polycarbonates; aliphatic and aromatic polyamide fibers, including polycaprolactam fibers; polyacrylonitrile fibers; polyvinyl acetate fibers; polyacrylate fibers; and in particular, polyvinyl alcohol fibers are also useful. Other polymers suitable for preparing interactive fibers include polyurethanes, both aromatic and aliphatic; polyureas; polyurethaneureas; polyetherketones; polyetheretherketones; polysulfones; polyethersulfones; polyetherketone sulfones, and polyphenylsulfides; as well as less interactive fibers which have been chemically treated or corona treated to increase the matrix-to-fiber interaction. Such fibers are by now well known to those skilled in the art. Fibers which exhibit a matrix interaction which is so strong that fiber breakage is exhibited rather than pullout, for example polyvinyl alcohol fibers, may be oil-treated, for example with paraffinic or silicone oils, to reduce the matrix interaction to the desired level.

Stainless steel fibers of relatively large size are not particularly useful in the subject invention. However, stainless steel fibers which are of very small diameter, e.g. 100 μm or less, preferably about 40–80 μm and most preferably about 60 μm are useful, particularly if coated to increase bonding strength with the matrix, e.g. brass coated fibers or fibers coated with organic adhesion increasing additives. Such fibers are currently quite expensive, and polymer fibers are generally preferred for this reason. The fibers used preferably have a modulus such that upon being axially stressed, radial contraction is relatively low such that the polymers are not easily pulled from the matrix, as may occur with low modulus fibers such as polypropylene.

Preferred fibers exhibit a strength of 800 MPa or more; a modulus of elasticity of 10 to 300 GPa, more preferably 40 to 200 GPa; interfacial chemical bonding below 4.0 J/m$^2$ and more preferably below 2.5 J/m$^2$ and, preferably, depending upon interfacial frictional stress, above 0.1 J/m$^2$, more preferably above 0.3 J/m$^2$; interfacial frictional stress between 0.5 and 3.0 MPa, and more preferably between 0.8 and 2.0 MPa; and an interfacial slip hardening coefficient below 3.0 and more preferably below 1.5. All the latter properties may be obtained from the single fiber pullout test alluded to earlier.

Fiber length is generally longer than 4 mm, and limited in length only by processing restraints. Continuous fibers in the form of tow, yarn, woven fabric, non-woven fabric and the like may also be used in some applications. Such continuous fiber products generally introduce anisotropy into the cured structure. Staple fibers in the form of individual fibers, strands of fibers, short pieces of yarn, tow, etc., are preferably used, preferably in lengths of 4 mm to 100 mm, more preferably 6 mm to 50 mm, yet more preferably 8 mm to 30 mm, and most preferably in the range of 10 mm to 20 mm. Longer fibers generally induce greater mixing problems. It is also possible to employ mixtures of fibers, either random mixtures, or multimodal distributions, for example a bicomponent mixture of a first population of fibers having lengths of 8–12 mm with a lesser amount of fibers having lengths of 20 to 50 mm. The polymer of the fibers may be the same or different, i.e., a variety of polymer fibers may be employed.

Examples of preferred reinforcing fibers useful in the present invention include aromatic polyamide fibers ("aramid" fibers), ultra high modulus polyethylene fibers, i.e. SPECTRA™ fibers, and polyvinyl alcohol fibers. This list is illustrative, and not limiting. The fibers preferably contain polar groups, and more preferably hydrophilic groups which provide a high degree of interaction with the brittle matrix ("matrix interactive"). Fibers which hydrolyze under basic conditions, such as polyester fibers, are not preferred. Examples of fibers which are not suitable include carbon fibers, conventional polypropylene fibers, cellulose fibers, and low density polyethylene fibers. Copolymer fibers are also useful, for example high modulus polyethylene fibers also containing residues of hydrophilic monomers such as acrylic acid, maleic anhydride, fumaric acid, 2-hydroxyethylacrylate, vinyl acetate, and the like. Such monomers, when polymerized with ethylene, are preferably used in small quantities to preserve the modulus of the fiber. A preferred fiber is K-II REC™, a polyvinylalcohol fiber available from Kuraray Co., Ltd., Osaka, Japan, having a nominal diameter of 39 μm, a mean length of 12 mm, a modulus of elasticity of 42.8 GPa, a frictional stress of 2.0 GPa, a chemical bond strength of 2.2 J/m$^2$, a slip hardening coefficient of 1.2, and a nominal strength of 1620 MPa.

Selection of particular fibers and fillers can be determined from micromechanical models which relate the mechanical interactions between fiber, brittle matrix, and interface phases to composite ductility. A fundamental requirement for a fiber-reinforced brittle matrix composite to strain harden in tension is the occurrence of steady state cracking, wherein a crack increases in length at constant ambient tensile strength $\sigma_{ss}$ while maintaining a crack opening $\delta_{ss}$. D. Marshall and B. N. Cox, "A J-integral Method for Calculating Steady-State Matrix Cracking Stress in Composites," MECHANICS OF MATERIALS, V. 7, No. 8, August, 1988, pp. 127–133. This phenomenon prevails when the condition:

$$J'_{tip} = \sigma_{ss}\delta_{ss} - \int_0^{\delta_{ss}} \sigma(\delta)\,d\delta \qquad (1)$$

is satisfied. In Eqn. (1), $J'_{tip}$ approaches the matrix toughness $K_m^2/E_m$ at small fiber content, such as less than 3% by volume. $\sigma(\delta)$ is the generalized stress-crack opening relationship, which describes the inelastic deformation $\delta$ at a crack face when subject to ambient stress σ. Since the maximum ambient stress is bounded by peak bridging stress $\sigma_0$, it reveals an upper limit on the matrix toughness for steady state crack propagation mode:

$$\frac{K_m^2}{E_m} \leq \sigma_o \delta_o - \int_0^{\delta_o} \sigma(\delta) d\delta \equiv J_b' \qquad (2)$$

where $\delta_0$ is the crack opening corresponding to $\sigma_0$.

In order to apply the steady state cracking condition in material design, the stress-crack opening relationship σ(δ) has to be correlated to micromechanics parameters of each material phase. For the case of discontinuous short fiber-reinforced cementitious composite, a comprehensive analytic σ(δ) model can be found in V. C. Li, "Post-Crack Scaling Relations for Fiber-Reinforced Cementitious Composites," ASCE J. OF MATERIALS IN CIVIL ENGINEERING, v. 4, No. 1, 1992, pp. 41–57; Z. Lin et al., "On Interface Property Characterization and Performance of Fiber Reinforced Cementitious Composites," J. CONCRETE SCIENCE AND ENGINEERING, RILEM, Vol. 1, 1999, pp. 173–184. In this model, the fiber is characterized in terms of volume fraction $V_f$, fiber length $l_f$, diameter $d_f$, elastic modulus $E_f$ and tensile strength $\sigma_{fu}$. The matrix is characterized in terms of its fracture toughness $K_m$, elastic modulus $E_m$ and initial flaw size distribution $a_0$. The fiber and matrix interaction, or interface characteristics, are described by the interfacial frictional stress $\tau_o$, chemical bond $G_d$ and slip-hardening coefficient β. Specifically, the energetics of crack propagation along fiber/matrix interface is used to quantify the debonding process and the bridging force of a fiber with given embedment length; statistics is introduced to describe the random nature of preexisting flaws and the random location and orientation of fibers. The condition for strain hardening in conventional HPFRCC is thus assumed to require $J'_b/J_{tip}>1$, and that condition is preferred in the subject invention composites as well.

In addition to the matrix interactive fibers heretofore described, the composite may also contain matrix non-interactive fibers such as relatively non-polar polyolefin polymer fibers such as low density polyethylene, polypropylene, and copolymers of ethylene and/or propylene with other substantially non-polar monomers, preferably polyolefin monomers. In addition to these matrix non-interactive fibers, fibers with an extraordinary attraction to the matrix may also be used in the present invention, particularly with high fracture toughness, high density matrices in the range of 2.1 to 2.4 g/cm³, more preferably 2.2.to 2.4 g/cm³. Such fibers are generally counter-indicated in matrices which rely on random crack initiation for strain hardening behavior. Because in any given sample, the number of crack-initiating sites may either be small or be distributed very unevenly, the cracks will be expected to enlarge appreciably with increasing strain. Use of an appreciable amount of very strong, very matrix interactive fibers in such a situation will limit crack expansion until the fibers reach their breaking point, at which time catastrophic failure will occur. In the present invention, with a much larger quantity of cracks, distributed in a uniform manner, a quantity, of such higher strength, high matrix-interactive fibers is useful. The volume percentage of such fibers is preferably less than 30% of the total fiber volume, more preferably less than 20%, and most preferably less than 10%.

The composites of the present invention require a large amount of purposefully introduced crack-initiating "voids."

The term "void" is not used in the sense of a necessarily empty cavity, or one filled with a gas such as air, but rather is a locus within the composite where cement and hard aggregate are absent, and where cracking is readily initiated. Crack-initiating voids are not inclusive of fibers, and are of three types: low tensile strength particles, which may be matrix interactive or non-interactive; matrix non-interactive particles of other than low tensile strength; and reactive particles which induce stable voids by reaction with other components of the matrix or with themselves. The first and second types of crack-inducing voids are preferred.

Low tensile strength crack inducing voids include organic or inorganic materials with very low tensile strength, i.e., a tensile strength of less than 1 MPa. This tensile strength is much lower than the strength of the matrix, which is on the order of 3 MPa. Thus, when subject to stress, the low tensile strength materials do not serve to hold the matrix together as would a traditional aggregate material such as sand, gravel, or crushed stone, but rather serve as crack-initiating sites. Preferred low tensile strength materials are expanded mineral materials such as expanded shale, expanded mica, and the like. These materials are readily available in numerous sizes at modest to low cost. Such materials are, in general, highly porous or laminar in makeup, or both porous and laminar. Synthetic porous ceramic materials as well as highly porous, preferably brittle organic or inorganic polymers may also be used. In principle, expanded graphite may also be used. The particles should be able to substantially survive the mixing process while maintaining the targeted particle size.

The low tensile strength particles may be strongly attracted to the cementitious matrix, or may be non-interactive. Expanded shale arid mica, for example, are both relatively strongly attracted to a cementitious matrix. However, such particles may be coated with oil, or hydrophobicized with fatty acid salts such as calcium stearate or with silanes or silicone fluids to lower their interaction with the matrix. With these types of voids, matrix interaction is not critical, since the failure mode is due to the low tensile strength or interlaminar strength of the particles. In some cases, cross-sections of cracked specimens show cracks extending across the width of the particles themselves.

A second, preferred crack-initiating void constitutes a matrix non-interactive particle. Preferably, such particles are of organic composition, and are preferably organic polymers. While in principle low molecular weight oligomers such as polyethylene, polypropylene, and polyisobutylene waxes may be used, as well as waxy "monomeric" organic compounds such as higher fatty alcohols, fatty acids, and esters thereof, or higher triglycerides, the particles must also have sufficient cohesiveness and hardness to survive the cement mixing process without significant disintegration. Relatively hard waxes, and particularly polyolefin polymers such as polyethylene, polypropylene, polybutylene, and copolymers thereof are eminently suitable, for example. Such non-interactive particles may have, and in general, do have, significant tensile strength. The tensile strength of high density polyethylene and of polypropylene may be quite high, for example. This class of crack-initiating voids functions not by cracking itself, but rather by forming a low strength locus in the composite due to the lack of significant interaction between the cement matrix and the particles. These particles therefore behave in much the same way as an air-filled hole or bubble, except that size is predictable, distribution is uniform, and the amount is not affected by variations in the mixing process.

The non-interactive particles may also be formed of polymers which ordinarily exhibit significant interaction with the matrix, but which have been treated to eliminate or reduce the interaction, for example by oiling, by hydrophobicization, or by coating with non-polar substances or polymer films, etc. Thus, for example, nylon beads which have been coated with silicone, wax, or polypropylene may be used, as well as beads of polyacrylates, polyester, etc. Preferred particles of this class are polyolefins, or polyesters which are prepared from longer chain glycols and dicarboxylic acids so as to be relatively less polar. The particles of this class may also be hollow, although it is likely that such particles would be more expensive than their solid counterparts. In any case, the wall thickness should be sufficiently great relative to the size of the beads so that the beads may stand considerable compression without bursting, as might be experienced at the bottom of a cast column or pier, for example. The shape may be round, elliptical, polygonal, etc. However, these are substantially discrete particles, not long filaments. The aspect ratio is preferably less than 4:1, more preferably less than 2:1.

The third class of crack-initiating voids is that of expandable crack initiators. The foregoing two classes are passive in the sense that cracks will not generally develop until the cured composite is placed under tensile stress. In the last category, voids may be created which generate sufficient expansive force to create cracks in and of themselves, thus being active crack initiators. Certain of these particles of the third embodiment may also expand to create an expanded void, which may contain only an expansive gas, or may contain other substances, e.g., polymer particles, as well.

The particles in this third class of crack-initiating voids differ from the two foregoing classes in that the particles added to the cement will be smaller than the voids they form. One example of such a particle comprises aluminum particles, which can react with the alkaline matrix to produce voids filled with hydrogen gas. A further example is a polymer bead containing a thermally or preferably, alkaline-activated blowing agent to expand the size of the particle.

Regardless of which type of particle is used in this third embodiment, the particles must be sufficiently stable with respect to the fresh mix that substantial reaction is avoided until the concrete is poured and begins to set. For example, aluminum particles may be coated with a thin coating of wax or polymer which will be partially abraded during the mixing process, to the extent that full reaction is delayed considerably, and gas bubbles are created during the setting process. Alternatively, the aluminum particles may be uncoated, and of a size larger than necessary to form the desired size of voids, an initial portion reacting during preparation of the mix, but the generated gas being dispersed in the form of very small cells or escaping from the mix.

While purposefully introduced air may be used to lower composite density somewhat, such purposefully introduced bubbles are not effective alone as crack-initiating voids, since their formation is too subject to process variations, and their low density allows them to rise prior to setting of the composite, particularly if allowed to coalesce. The result would be a composite with more crack-initiating voids at the top rather than being continuously distributed throughout. On the other hand, gas bubbles formed by reaction of active metals such as aluminum, magnesium, or zinc with alkaline components of the matrix will form to the most substantial degree when the concrete is setting, and when its viscosity is too high to allow the gas bubbles formed to either coalesce significantly or to rise appreciably. Moreover, due to the higher density of the particles prior to reaction, relative to the density of air, the particles will remain substantially uniformly distributed in the mix. This category of void-forming particles is not preferred, however.

The size of the voids introduced into the matrix, regardless of which class of void-forming particles are employed, ranges from 0.5 mm to about 6 mm, preferably 1 mm or greater to about 5 mm, and most preferably in the range of 3 to 5 mm. The amount of voids, on a volume basis, may be up to 20 volume percent, but such a large amount is generally undesirable. More preferably, the purposefully introduced void content is from 1 volume percent to about 15 volume percent, yet more preferably 3 volume percent to 10 volume percent, and most preferably between 6 and 9 volume percent. Amounts of 5% have proven remarkably effective, while amounts in the range of 7–8% are optimal for many formulations.

While particles of the sizes given above will all work to some extent in many mixes, it is very desirable to tailor the particle size to the size of unintentional voids which are to be expected in the mix ("naturally occurring voids"), and particularly, to the size of the naturally occurring voids which cause cracking in the matrix. In the absence of intentionally added crack-initiating voids, the number of cracks in a specimen prepared from an otherwise identical, or very similar mix will be less than that expected from a specimen of the subject invention. Such a specimen may be subjected to tensile testing until a plurality of cracks occur, or the specimen may be strained until failure occurs. In either case, by sawing along the cracks, the voids which initiate the crack may be identified. These voids tend to be the larger of the voids contained in the matrix, and the intentionally added voids are preferably selected in size as to be from 50% to 200% of the diameter of the average diameter these natural crack initiating voids, more preferably from 80% to 150% of the average diameter, and most preferably from 90% to 120% of the average diameter, and preferably not larger on. average than 6 mm, preferably not larger on average than 5 mm.

A second method of tailoring the size of the intentionally added. crack-initiating voids, which may be used in the absence of tensile testing, is to visually observe the type and distribution of voids. Thus, for example, a given mixing apparatus, with a given mix of ingredients and mixing regimen, will generate unintentional voids of a certain mean size. A visual estimate of the naturally occurring void size may be made by casting a specimen, slicing one or more sections, and observing an average void size with the eye or with the aid of a magnifying glass. Occasional very large voids will of course occur, and these may be ignored, as may also those too small to be easily visually observed. The average void sizes generally range from about 0.5 mm to about 5 mm, in other words, substantially the same size and size range of the crack-initiating voids to be purposefully introduced, and it is these voids which are used in determining the average void size. In other words, voids below 0.5 mm in size and above 5 mm in size are ignored for the purposes of this calculation.

The preceding method is also subject to automation by optical scanners which have been programmed by conventional pattern recognition algorithms to identify and measure the voids which occur in the specimen. The output may be used to not only calculate an average void size, but may also be used to plot void size distribution. The foregoing method involving only visual identification and measurement is usually sufficient to identify the correct size of intentionally added crack-initiating voids. However, when applying this method, care must be taken to ensure that the distribution of void sizes is typical. For example, a processing variant which causes a relatively larger population of very small voids may skew the resulting average to too low a value. In such cases, the first method of measurement should be used, or an intentionally added void size should be selected which is substantially greater than the measured natural void size, perhaps even more than 200% greater.

Figure 7:
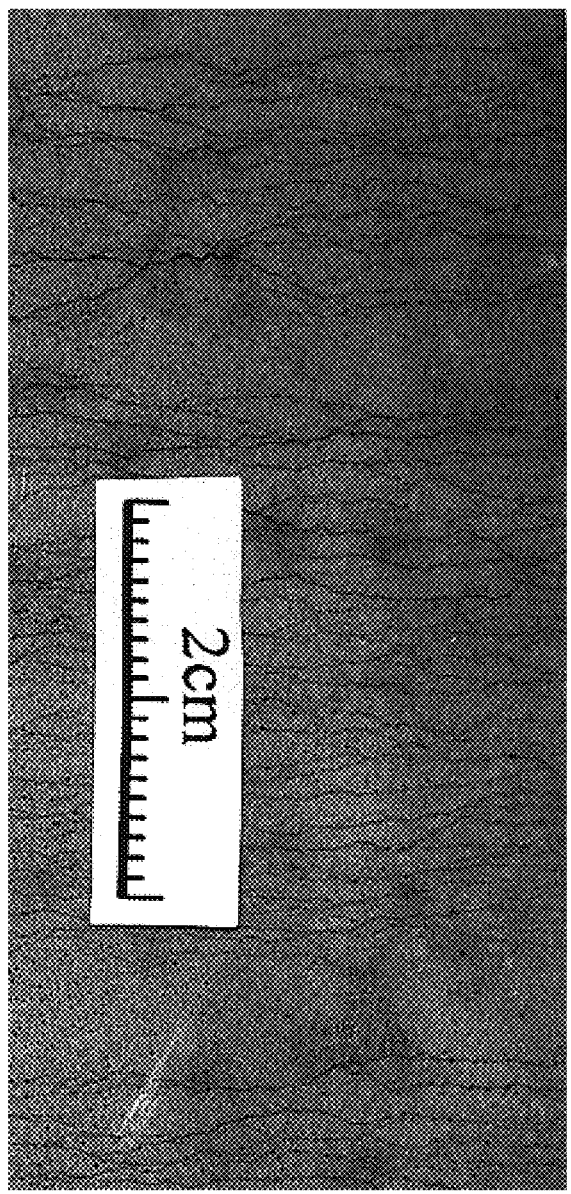
FIG. 7 illustrates the stress v. strain curve of Example 2B.

However, the surest method to ascertain the correct intentionally added crack-initiating void size is to simply add particles of a given size, preferably selected based on one of the above measurement regimens, and test a specimen for multiple cracking under tensile strain. Preferably, a "saturated" crack distribution such as that shown in FIG. 7 is obtained. Similar specimens with particle sizes above and below the targeted size may be prepared and examined as well. Examination may also include measurement of stress v. strain curves. Since the mixtures to be tested are readily and inexpensively prepared, the testing necessary is very modest.

For optimal performance, the size of the purposefully introduced voids should range from about 50% to about 200% of the diameter of the naturally occurring voids, more preferably from about 80% to about 150%. Best performance is achieved with purposefully introduced voids which are of about the same size as the average size of the naturally occurring voids, or larger. Smaller purposefully introduced voids will tend to initiate crack formation at a higher stress than the larger voids. Thus, if there is a great disparity between the size of relatively fewer but larger natural voids and the size of the voids added, the former will initiate cracks at a lower stress level, and if sufficiently lower, will behave as though the purposefully introduced voids were absent, generating random, non-uniformly distributed cracks which may fail prior to secondary cracks appearing. The result will be pseudo-ductile or brittle behavior rather than ductile behavior.

The brittle matrix is preferably of the cementitious type. All mixes known to those skilled in the art may be used, and mix proportions, including sand, larger aggregates, additives, etc., are those conventionally employed. Having generally described this invention, a further understanding can be obtained by reference to certain specific examples which are provided herein for purposes of illustration only and are not intended to be limiting unless otherwise specified.

EXAMPLES 1–3 AND C1, C2

Three different particles were used as artificial flaws, including two types of low tensile strength particles and one type of plastic beads. The low tensile strength particles, under the commercial name Norlite™, are made from expanded shale and have low tensile strength due to a porous microstructure. Two sizes of Norlite™ particles were tested, with average sizes of 1.0 mm and 3.5 mm, respectively. The plastic beads used are polypropylene (PP) and have an elliptical shape and a smooth surface. The length of the long and short axes of the beads is about 4 mm and 2 mm, respectively. Since PP has very weak bond to a cementitious matrix, the interface will behave like an embedded crack. All three particles are graded and have a narrow size distribution. A narrow size distribution is preferable to encourage uniform cracking.

The mix proportions of five mixes, divided into two groups are listed in Table 1, where mixes in each group share same mix proportion except for the presence of artificial flaws (AF). In Example 2B, the small Norlite™ particles are used to substitute part of the sand. PVA REC15 fiber from Kuraray Co. is used in this study at a fixed volume fraction of 2%. The fiber has a length of 12 mm and a diameter of 39 μm. Details of the fiber properties can be found in V. Li et al. "Interface Tailoring For Strain-Hardening PVA-ECC." ACI MATERIALS J. 99 (5), 463–72 (2002). Other ingredients include Type 1 OPC, fine silica sand (average size 110 μm), class C fly ash, and superplasticizer (SP).

The mixtures were prepared by conventional fiber-reinforced concrete preparation procedures. Coupon specimens measuring 304.8 mm×76.2 mm×12.7 mm for tension testing were cast and cured in water for 28 days before testing. The tensile behaviors of the composites were characterized by direct uniaxial tension test under displacement control, as described in V. Li et al., op. cit., herein incorporated by reference. The loading rate was 0.15 mm/min throughout the test. Two external LVDTs (Linear Variable Displacement Transducer) were attached to the specimen surface with a gage length of about 180 mm to measure the displacement. Average crack spacing was measured after unloading. For the control mixes (Comparative Examples C1 and C2), the coupon specimens were sliced normal to the longitudinal direction at the cracked and uncracked sections using a diamond saw, and the cut surface was observed under an optical microscope to examine the large pore size distribution at the section.

TABLE 1

Mix Proportions

| | Group 1 | | Group 2 | | |
|---|---|---|---|---|---|
| Example | Ex. C1. | Ex. 1 | Ex. C2 | Ex. 2A | Ex. 2B |
| Cement | 1.0 | 1.0 | 1.0 | 1.0 | 1.0 |
| Sand | 0.8 | 0.8 | 0.8 | 0.8 | 0.7 |
| FA | 0.8 | 0.8 | 1.2 | 1.2 | 1.2 |
| Water | 0.43 | 0.43 | 0.53 | 0.53 | 0.53 |
| SP | 0.03 | 0.03 | 0.03 | 0.03 | 0.03 |
| Fiber (vol %) | 2.0 | 2.0 | 2.0 | 2.0 | 2.0 |
| AF type | — | Norlite™ | — | PP | Norlite™ |
| AF size (mm) | — | 3.5 | — | 4.0 | 1.0 |
| AF (vol %) | 0 | 0.07 | 0 | 0.07 | 0.10 |

All proportions are by weight except fiber and AF.

The stress-strain curves of all five mixes are presented in FIGS. 1–5, respectively and the results in terms of first cracking strength $\sigma_{fc}$, ultimate strength $\sigma_{cu}$, ultimate strain $\epsilon_{cu}$ (e.g., strain at ultimate strength), and crack spacing $x_d$ are summarized in Table 2. The crack patterns of Examples C1 and 1 are presented in FIGS. 6 and 7, respectively.

TABLE 2

Uniaxial Tension Test Results

| | Group 1 | | Group 2 | | |
|---|---|---|---|---|---|
| Example | Ex. C1 | Ex. 1 | Ex. C2 | Ex. 2A | Ex. 2B |
| $\sigma_{fc}$(MPa) | 4.88 | 4.75 | 4.06 | 3.74 | 3.80 |
| $\sigma_{cu}$(MPa) | 6.40 | 6.82 | 4.84 | 4.63 | 4.90 |
| $\epsilon_{cu}$(MPa) | 0.38 | 2.48 | 1.86 | 3.79 | 1.89 |
| $x_d$(mm) | 16.2 | 2.4 | 4.8 | 2.2 | 4.9 |

The control mixes exhibit relatively low ductility compared to previously developed PVA-ECC materials (e.g., V. Li et al. op. cit.), which exhibit strain capacities typically ranging from 3–5%. Micromechanics modeling reveals that the ratio $J'_b/J_{tip}$, which indicates the potential of developing multiple cracking, is 0.44–1.02 and 0.62–1.24 for Examples C1 and C2, respectively. As mentioned previously, $J'_b/J_{tip}>1$ is a necessary condition for achieving strain-hardening in conventional HPFRCC. Example C 1 barely satisfies this condition, and as a result, only few cracks were developed prior to failure. For Example C2, the higher $J'_b/J_{tip}$ ratio unsurprisingly leads to higher strain capacity. In contrast, the $J'_b/J_{tip}$ ratio of the PVA/ECC reported in V. Li et al., op. cit. falls in the range of 4.74–7.62, which is considerably higher than that of the control mixes in this study. Therefore, the margin to develop multiple cracking in Examples C1 and C2 is slim.

Figure 6:
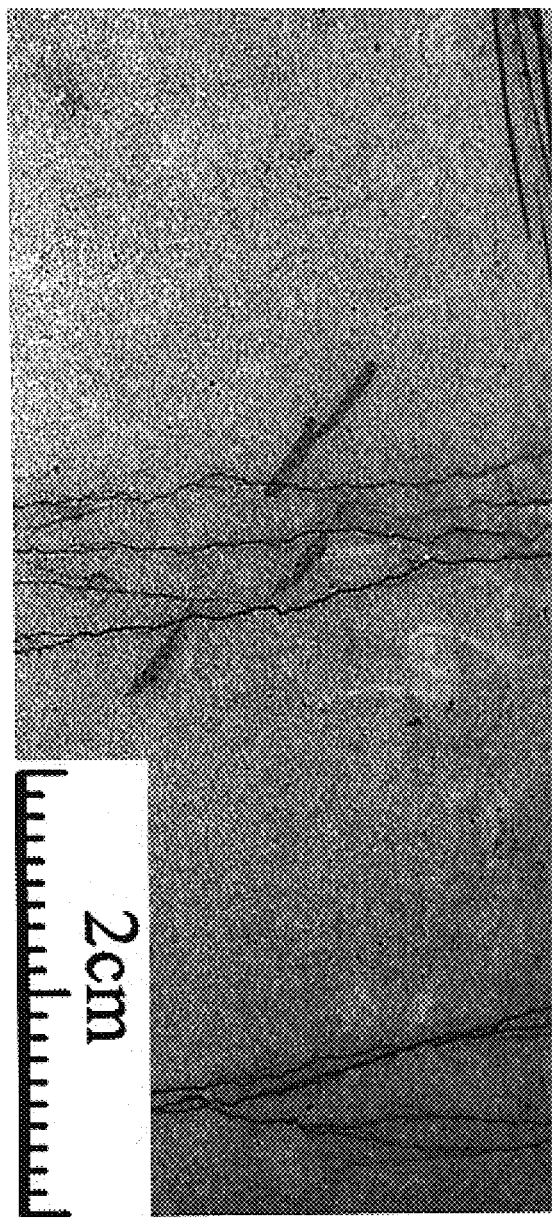
FIG. 6 illustrates the stress v. strain curve of Example 2A.

Photographs of the specimen surface clearly reveal the unsaturated crack patterns of Examples C1 and C2, the former as displayed in FIG. 6. Large variation in crack spacing is observed, spanning from 2 mm to 50 mm. Closely spaced cracks can be found locally on both mixes, while there are large areas with no cracks at all, indicating that an insufficient number of large flaws existed in the matrix that could be activated.

The largest voids-on the cracked sections of Example C1 range from 2.5 mm to 5 mm with an average of 3.4 mm, while the largest voids on the cracked sections of Example C2 range from 1.7 mm to 4.2 mm with an average of 2.8 mm. Although the void size of Example C2 is smaller than that of Example C1, the matrix cracking strength of Example C1 is generally higher than that of Example C2. This may be attributed to the difference of matrix fracture toughness between these two mixes, as matrix $K_{IC}$ is measured as 0.67 and 0.61 $MPa.m^{1/2}$ for Examples C1 and C2, respectively.

Significant improvement in strain capacity was observed in Examples 1 and 2A with the addition of relatively large artificial flaws, and in both cases multiple cracking exhibits a nearly saturated pattern, the pattern for Example 1 being shown in FIG. 7. For Example 1, the ultimate strain increases from 0.38% of Example C1, to 2.48%, and the average crack spacing drops from 16.2 mm to 2.4 mm. For Example 2A, the average strain capacity improves more than 100% from that of Example C2, accompanied by decrease of average crack spacing from 4.8 mm to 2.2 mm. The presence of the artificial flaws shows negligible influence on the ultimate strength, while it slightly reduces the first cracking strength. In steady state cracking, the matrix cracking strength is bounded on the low side by the steady state stress. Since the size of the introduced artificial flaws is close to the largest voids in the matrix, it is not surprising that the presence of additional flaws has little effect on the matrix cracking stress.

The importance of controlling the size of the artificial flaws is demonstrated by the results of Example 2B. The Norlite™ particles used in Example 2B (1 mm) are much smaller than many voids found at the section; in contrast, the size of the artificial flaws introduced in Examples 1 and 2A are comparable to the size of the largest voids. As a result, only slight improvement in multiple cracking behavior and strain capacity is observed at best in Example 2B compared to the control mix, even if the number of the artificial flaws in Example 2B is much higher than that in Example 2A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for increasing strain hardening in fiber-reinforced cementitious composite containing natural flaws, comprising:
   a) selecting a hydraulically settable matrix composition containing matrix interactive fibers;
   b) adding to said composition, crack-initiating, void-forming particles, said particles forming voids having a size of from 0.5 mm to 5 mm, said voids present in an amount of about 1 volume percent to about 20 volume percent;
   c) adding water to a) and b) to form a setting composition, and allowing said setting composition to set to a fiber-reinforced cementitious composite, wherein said volume percent is based on the total volume of said fiber-reinforced cementitious composite, and wherein components a), b) and c) may be admixed in any order, said hydraulically settable matrix composition, when hydraulically set by addition of water but without void-forming particles b), having a density of about 1.95 $g/cm^3$ to 2.4 $g/cm^3$.

2. The process of claim 1, wherein said natural flaws comprise air bubbles, and wherein at least a portion of said void-forming particles are selected from the group consisting of particles having a tensile strength less than 1 MPa, particles having low interaction with the matrix composition, and mixtures thereof.

3. The process of claim 1, wherein said void-forming particles comprise small active particles which expand to create voids larger than said active particles, said voids having an average size in the range of 0.5 mm to 5 mm.

4. The process of claim 3, wherein said void-forming particles comprise hydrogen gas-generating metal particles or expandable thermoplastic particles.

5. The process of claim 2, wherein said void-forming particles comprise thermoplastic particles.

6. The process of claim 5, wherein said thermoplastic particles comprise thermoplastic beads.

7. The process of claim 6, wherein said thermoplastic beads comprise polyolefin beads.

8. The process of claim 2, wherein said void-forming particles comprise a porous or laminar mineral product having a tensile strength in at least one direction of less than 1 MPa.

9. The process of claim 8, wherein said void-forming particles comprise expanded mica or expanded shale.

10. The process of claim 2, wherein the average size of the crack-initiating voids is from about 50% to about 200% of the size of naturally occurring voids calculated based on the average of naturally occurring voids in the range of 0.5 mm to 5 mm.

11. The process of claim 5, wherein the average size of the crack-initiating voids is from about 50% to about 200% of the size of naturally occurring voids calculated based on the average of naturally occurring voids in the range of 0.5 mm to 5 mm.

12. The process of claim 7, wherein the average size of the crack-initiating voids is from about 50% to about 200% of the size of naturally occurring voids calculated based on the average of naturally occurring voids in the range of 0.5 mm to 5 mm.

13. The process of claim 8, wherein the average size of the crack-initiating voids is from about 50% to about 200% of the size of naturally occurring voids calculated based on the average of naturally occurring voids in the range of 0.5 mm to 5 mm.

14. The process of claim 9, wherein the average size of the crack-initiating voids is from about 50% to about 200% of the size of naturally occurring voids calculated based on the average of naturally occurring voids in the range of 0.5 mm to 5 mm.

15. The process of claim 1, wherein the average size of the crack initiating voids is from about 50% to 150% of the average size of naturally occurring voids which are found to have initiated cracks in a test specimen subjected to tensile stress with an identical matrix composition but containing no intentionally added crack-initiating voids.

16. The process of claim 2, wherein the average size of the crack-initiating voids is from about 50% to 150% of the average size of naturally occurring voids which are found to have initiated cracks in a test specimen subjected to tensile stress with an identical matrix composition but containing no intentionally added crack-initiating voids.

17. The process of claim 3, wherein the average size of the crack-initiating voids is from about 50% to 150% of the average size of naturally occurring voids which are found to have initiated cracks in a test specimen subjected to tensile stress with an identical matrix composition but containing no intentionally added crack-initiating voids.

18. A strain-hardening, fiber-reinforced cementitious composite, comprising the hydraulically set product prepared by the process of claim 1.

19. A strain-hardening, fiber-reinforced cementitious composite, comprising the hydraulically set product prepared by the process of claim 2.

20. A strain-hardening, fiber-reinforced cementitious composite, comprising the hydraulically set product prepared by the process of claim 5.

21. A strain-hardening, fiber-reinforced cementitious composite, comprising the hydraulically set product prepared by the process of claim 7.

22. A strain-hardening, fiber-reinforced cementitious composite, comprising the hydraulically set product prepared by the process of claim 8.

23. A strain-hardening, fiber-reinforced cementitious composite, comprising the hydraulically set product prepared by the process of claim 9.

24. A strain-hardening, fiber-reinforced cementitious composite, comprising the hydraulically set product prepared by the process of claim 10.

25. A strain-hardening, fiber-reinforced cementitious composite, comprising the hydraulically set product prepared by the process of claim 11.

26. A strain-hardening, fiber-reinforced cementitious composite, comprising the hydraulically set product prepared by the process of claim 12.

27. A strain-hardening, fiber-reinforced cementitious composite, comprising the hydraulically set product prepared by the process of claim 13.

28. A strain-hardening, fiber-reinforced cementitious composite prepared by the process of claim 1, wherein said matrix interactive fibers are present in an amount of from about 1 volume percent to about 2.5 volume percent based on the volume of the composite.

29. The composite of claim 18, a test specimen of which exhibits uniform cracking throughout the major portion of a test specimen prepared therefrom and having been subjected to uniaxial tension.

30. A process for increasing strain hardening in fiber-reinforced cementitious composite containing natural flaws, comprising:
    a) selecting a hydraulically settable matrix composition containing matrix interactive fibers;
    b) adding to said composition, crack-initiating, void-forming particles, said particles forming voids having a size of from 0.5 mm to 5 mm, said voids present in an amount of about 1 volume percent to about 20 volume percent;
    c) adding water to a) and b) to form a setting composition, and allowing said setting composition to set to a fiber-reinforced cementitious composite, wherein said volume percent is based on the total volume of said fiber-reinforced cementitious composite, and wherein components a), b) and c) may be admixed in any order, said hydraulically settable matrix composition, when hydraulically set by addition of water but without void-forming particles b), having a density of about 1.95 $g/cm^3$ to 2.4 $g/cm^3$, and wherein said void-forming particles comprise matrix non-interactive particles.

31. The process of claim 30, wherein said void-forming particles are hollow or solid beads of thermoplastic.

32. The process of claim 31, wherein said void-forming particles are polyolefin.

33. A strain hardening cement composition which comprises, prior to adding water and curing:
    a) a hydraulically settable matrix composition containing matrix interactive fibers;
    b) from 1 to 20 volume percent of crack-initiating non-matrix interactive, void forming particles having a size of from 0.5 mm to 5 mm, wherein said composition, when hydraulically set but without said void forming particles has a density of from 1.95$g/cm^3$ to 2.4 $g/cm^3$.

34. The cement composition of claim 33, wherein said void-forming particles are hollow or solid beads of thermoplastic.

35. The amount composition of claim 34, wherein said beads are polyolefin.

* * * * *